United States Patent
Rohner

(10) Patent No.: US 6,184,887 B1
(45) Date of Patent: Feb. 6, 2001

(54) METHOD AND APPARATUS FOR CLAMPING IMAGE GRADIENTS

(75) Inventor: Michel A. Rohner, San Jose, CA (US)

(73) Assignee: Oak Technology, Inc., Sunnyvale, CA (US)

( * ) Notice: Under 35 U.S.C. 154(b), the term of this patent shall be extended for 0 days.

(21) Appl. No.: 09/052,523

(22) Filed: Mar. 30, 1998

(51) Int. Cl.$^7$ .................................................. G06T 15/00

(52) U.S. Cl. .......................................................... 345/419

(58) Field of Search .................................. 345/419, 425, 345/434, 441, 108, 16, 501, 507, 421, 422, 427, 430, 431; 382/41

(56) References Cited

U.S. PATENT DOCUMENTS

| | | | |
|---|---|---|---|
| 5,101,442 | 3/1992 | Amir | 382/41 |
| 5,224,208 | 6/1993 | Miller, Jr. et al. | 395/125 |

*Primary Examiner*—Mark R. Powell
*Assistant Examiner*—Chante' E. Harrison
(74) *Attorney, Agent, or Firm*—Steven F. Caserza; Flehr Hohbach Test Albritton & Herbert LLP

(57) ABSTRACT

A system for avoiding overflow and underflow of image variables by clamping image gradients. The method is described with respect to a triangular polygon to be rendered, and a function for that polygon such as color. First the delta x and delta y values between each of the vertices of the triangle are computed. Using the delta x and delta y values, the area of the triangle is computed. The sign of the triangle area is used to determine whether the triangle is visible. If the triangle is visible then the method determines whether the width of the triangle in the x-direction, dx_min, is at least equal to a minimum threshold. To make this determination, first the vector with the largest delta y is selected. Using the largest delta y value, dx_min is computed. If dx_min is less than the threshold value, then a correction value is computed. The position of the vertex that is not part of the vector with the largest delta y is then corrected using the correction value. Making dx_min greater than or equal to the minimum threshold ensures that the dfx function gradients do not exceed the dynamic range of the system variables. The new triangle area is then computed. A similar method is performed to correct the height of the triangle, dy_min, if it is less than the minimum threshold. The area of the new triangle, which includes any required vertex position corrections, is used to compute the function gradients. Lastly, the function gradients are used to compute the function value at a reference point. Additional function values are then obtained by extrapolating from the reference point.

12 Claims, 12 Drawing Sheets

METHOD AND APPARATUS FOR CLAMPING IMAGE GRADIENTS

This invention pertains to computer graphics, and more particularly to a system for preventing overflow and underflow of image variables by limiting the minimum dimensions of polygons.

BACKGROUND

It is well known how to generate three-dimensional computer graphics images by modeling three-dimensional objects as a composite of two dimensional polygons, such as triangles. Texture mapping is then typically used to create more detail and realism in an image without geometrically modeling and rendering every three-dimensional surface.

Texture maps are sampled to determine the color of the display pixels of each polygon that is visible. The appearance of a pixel of an object is typically dependent on several functions such as: RGB components of color, alpha translucency, image depth (Z), and texture coordinates. The function values of an image pixel are determined by interpolation using function gradients in the x and y directions. Functions that are interpolated over triangular areas are of the form:

$$f(x, y) = f(0, 0) + \frac{\partial f}{\partial x} * x + \frac{\partial f}{\partial y} * y$$

where:

f(x,y) is the function at a reference point on the image;

$\frac{\partial f}{\partial x}$ is the function gradient in the x-direction; and $\frac{\partial f}{\partial y}$ is the function gradient in the y-direction.

On images where triangular polygons are used, for narrow triangles the interpolation function gradients can exceed the dynamic range of the system. In graphics systems each variable is typically allocated a predetermined number of bits. The number of bits that can be allocated for each variable is limited by the available hardware resources. For example, if a value is represented by an 8-bit integer variable its dynamic range is from 0 to 255. If a large gradient causes the value to exceed 255, then the value can wrap around, causing the wrong value to be stored. For example, if a color value wraps around then the pixel may appear white instead of black.

In a conventional graphics system the color of a polygon is defined by a plane equation consisting of a reference value, a horizontal gradient, and a vertical gradient. The color of each pixel is computed as the color at the center of the pixel. For each pixel, the sampling point is at the pixel center. In general, polygon edges cover only part of a pixel. In a quantized approach, the polygon is displayed in a pixel whenever the center of that pixel is inside of the polygon. In an antialiased approach, the polygon contributes only partially to the pixel color, even when the center of the pixel is outside of the polygon. For these pixels the extrapolated color components could overflow or underflow (i.e. wraparound). The maximum distance error of the sampling point occurs when the polygon edge is near a pixel corner. In this case the distance error is 0.5*sqrt(2) which is 0.7 pixel.

In conventional graphics systems gradient underflow and overflow often causes images to be displayed with artifacts. Such artifacts may include a pixel being displayed in the wrong color, or a pixel that is rendered at the wrong depth (Z), or a pixel with incorrectly sampled texture coordinates. Such artifacts may also cause images to appear to have jagged edges, and generally detract from the quality of the image display. In many graphics systems this poor image quality is accepted as being necessary to achieve desired performance levels.

One prior approach to limiting gradients is illustrated in FIG. 1. The method identifies triangles that are narrower than a defined threshold width and increases the width of those triangles to the minimum width. The width of the triangle in the x-direction is defined by the equation:

$$dx\_min = (slope\ 1 - slope\ 2) * \Delta y$$

where:

dx_min is the width of the triangle in the x-direction;

slope 1 is the slope of one side of the triangle;

slope 2 is the slope of a second side of the triangle; and

Δy is the height of the triangle.

When the difference between slope 1 and slope 2 is small this indicates a narrow triangle. When the product of the difference of the slopes and the triangle width is less than the minimum width, then the width of the triangle is temporarily increased to at least equal the minimum width, for the purpose of gradient computations.

SUMMARY

The present invention provides a system for avoiding overflow and underflow of image variables by clamping image gradients. The method is described with respect to a triangular polygon to be rendered and a function for that polygon such as color. First the delta x and delta y values between each of the vertices of the triangle are computed. In one embodiment, using the delta x and delta y values, the area of the triangle is computed from the cross product of the vectors that define the triangle. The sign of the triangle area is used to determine whether the triangle is visible. If the triangle is visible then the method determines whether the width of the triangle in the x-direction, dx_min, is at least equal to a minimum threshold. To make this determination, first the vector with the largest delta y is selected. Using the largest delta y value, dx_min is computed by the equation dx_min=area/(largest delta y). If dx_min is less than the threshold value, then a correction value is computed. This test uses intermediate values of the gradient computations and thereby minimizes the extra time that the gradient clamping test requires. The position of the vertex that is not part of the vector with the largest delta y is then corrected using the correction value. Making dx_min greater than or equal to the minimum threshold ensures that the dfx function gradients do not exceed the dynamic range of the system variables. A similar method is performed to correct the height of the triangle, dy_min, if it is less than the minimum threshold. If any vertex has been moved during the dx_min or dy_min test, the triangle area needs to be recomputed.

After the required vertex position corrections have been made, the area of the new triangle is computed. Next, the delta x and delta y values are divided by the triangle area to yield scaled dx and dy values. The function gradients are then computed using the equations dfx=df12*scaled_dy23−df23*scaled_dy12, and dfy=scaled dx12*df13−scaled dx23*df12. Lastly, the function gradients are used to compute the function value at a reference point. Additional function values are then obtained by interpolating from the reference point.

DETAILED DESCRIPTION OF THE PREFERRED EMBODIMENTS

Figure 1:
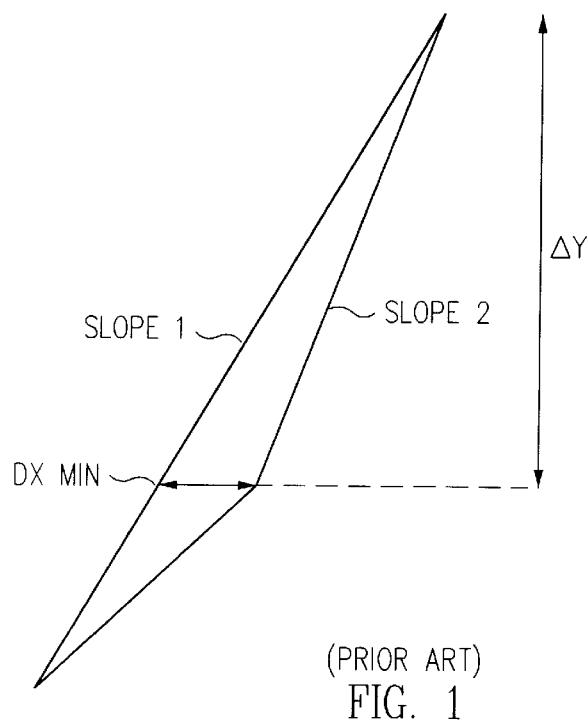
FIG. 1 illustrates a prior art method of limiting gradients.
Figure 2:
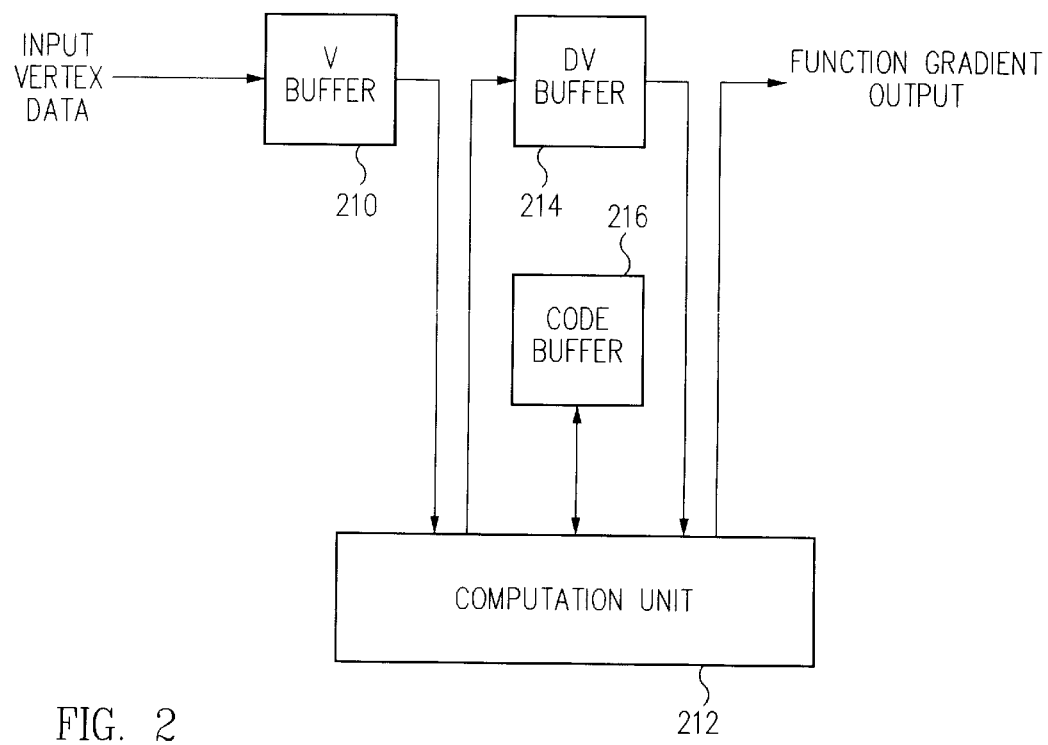
FIG. 2 illustrates a block diagram of gradient computation hardware according to one embodiment of the present invention.
Figure 3A:
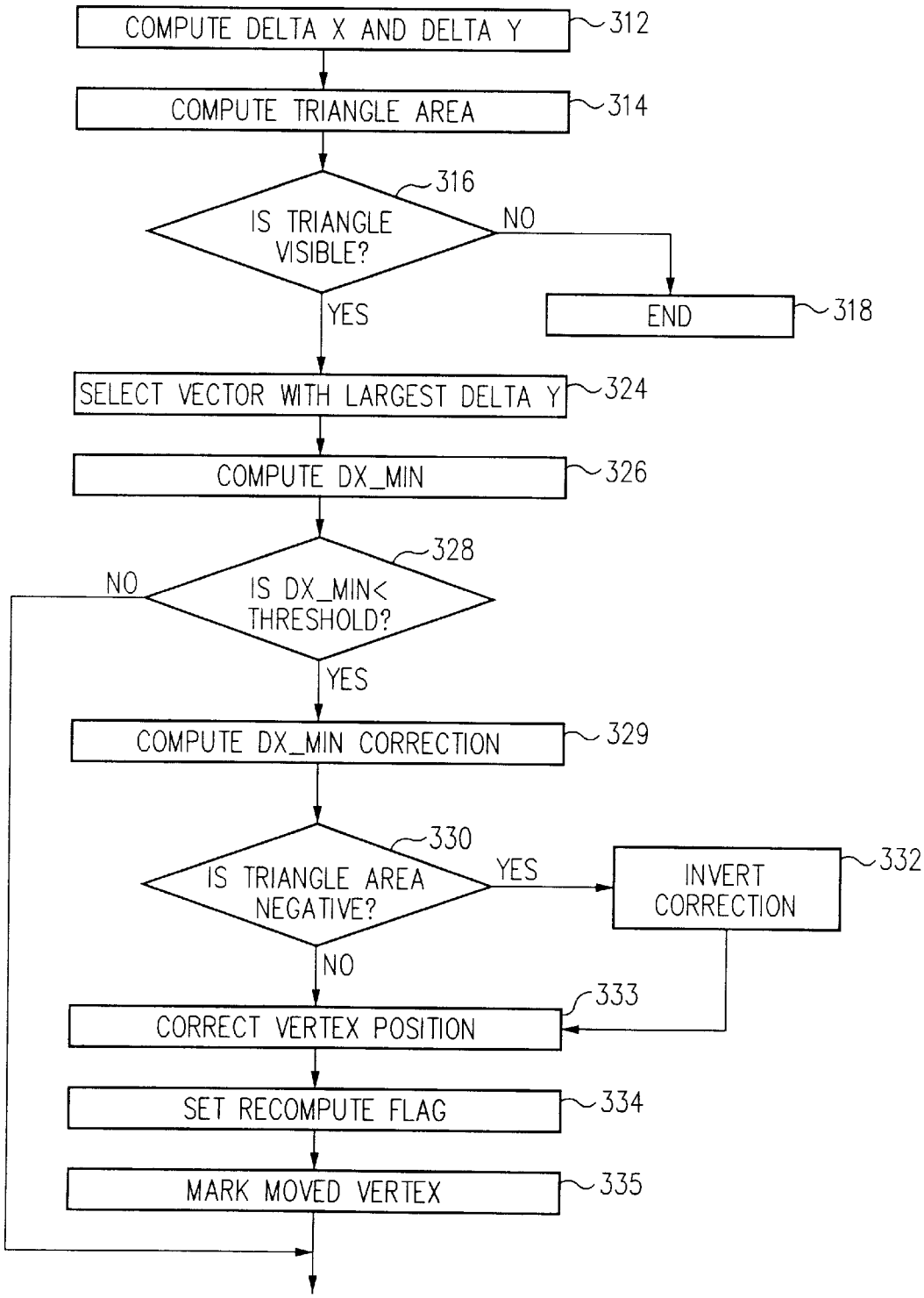
FIGS. 3A and 3B illustrate a flow chart of a method of correcting triangular polygons with sub-threshold dx_min or dy_min values according to one embodiment of the present invention.
Figure 3B:
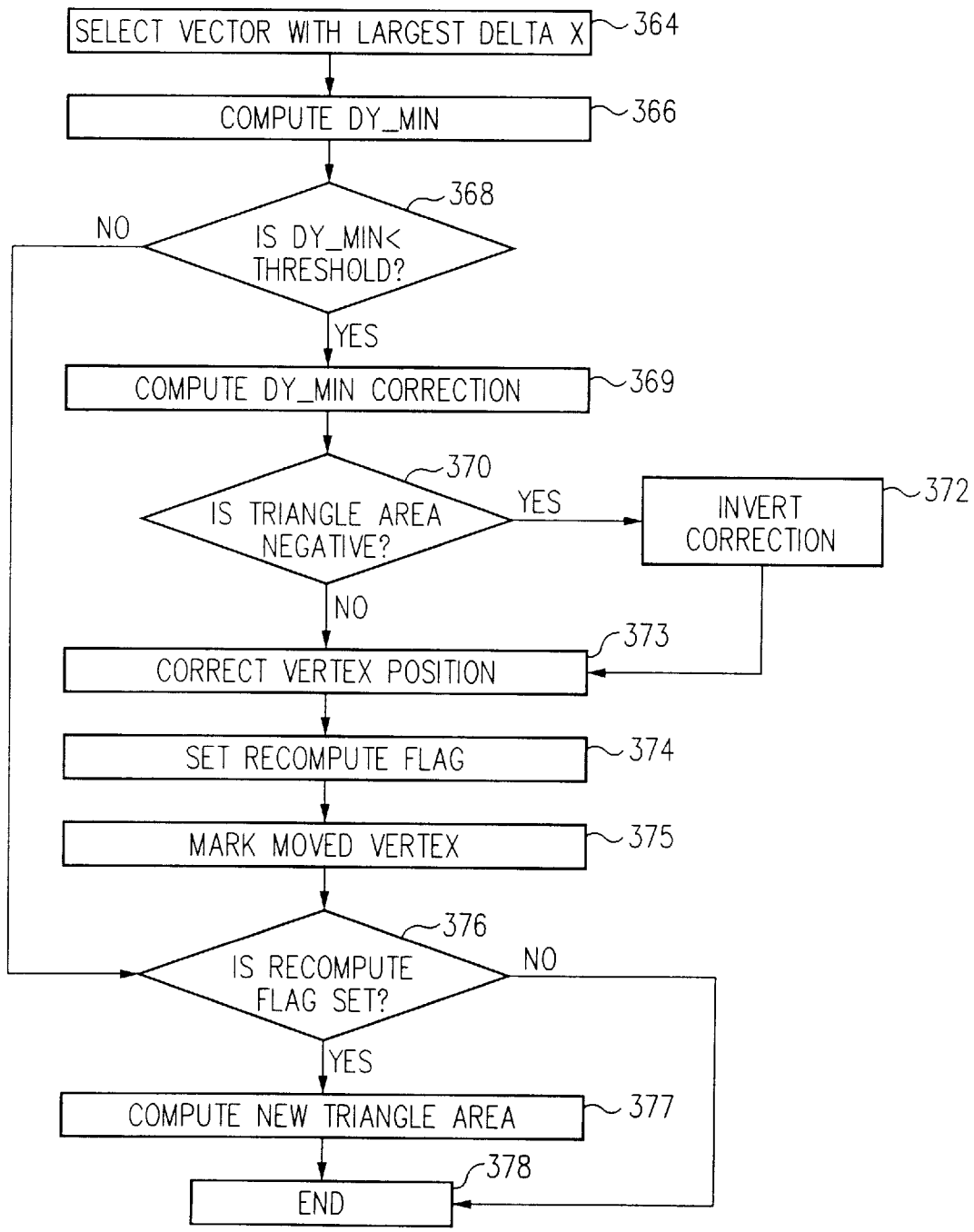
Figure 3C:
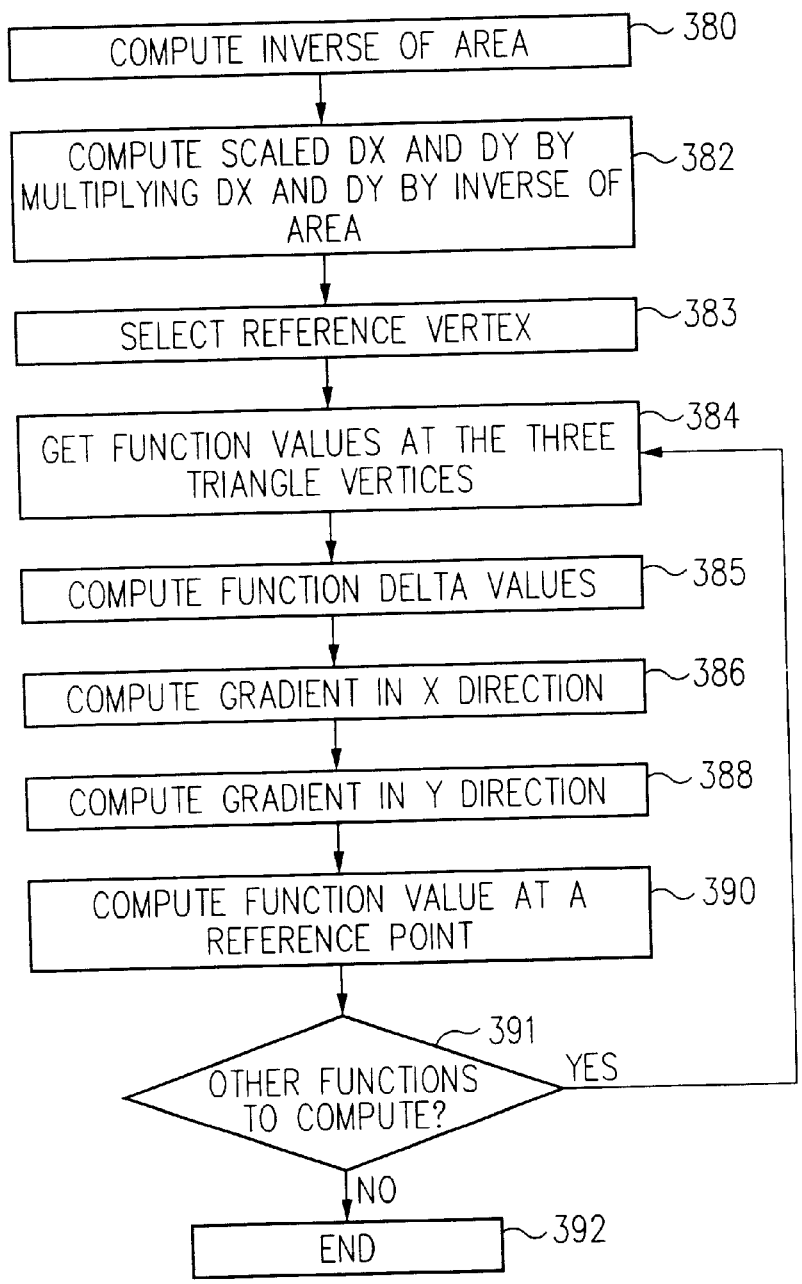
FIG. 3C illustrates a flow chart of a method of computing image gradients after the method of FIGS. 3A and 3B have been performed according to one embodiment of the present invention.

FIG. 2 illustrates a block diagram of gradient computation hardware according to one embodiment of the present invention. Vertex data is provided to V buffer 210. V buffer 210 stores the x and y coordinates of each vertex of a triangular polygon, as well as the function values at each of the vertices. V buffer 210 provides this data to computation unit 212. Computation unit 212 comprises a fixed point ALU, a floating point ALU, a floating point multiplier, and a floating point divider. Computation unit 212 computes the dx values, e values, delta function df values and ultimately the function gradients. The dx, dy and df values are stored in delta vertex buffer 214. For embodiments that use look-up tables, the look-up table codes are stored in code buffer 216. An overview of a method of clamping function gradients according to one embodiment of the present invention is illustrated in FIGS. 3A, 3B and 3C. FIGS. 4–11 illustrate details of particular components of the method.

dfx and dfy Gradients

Figure 4A:
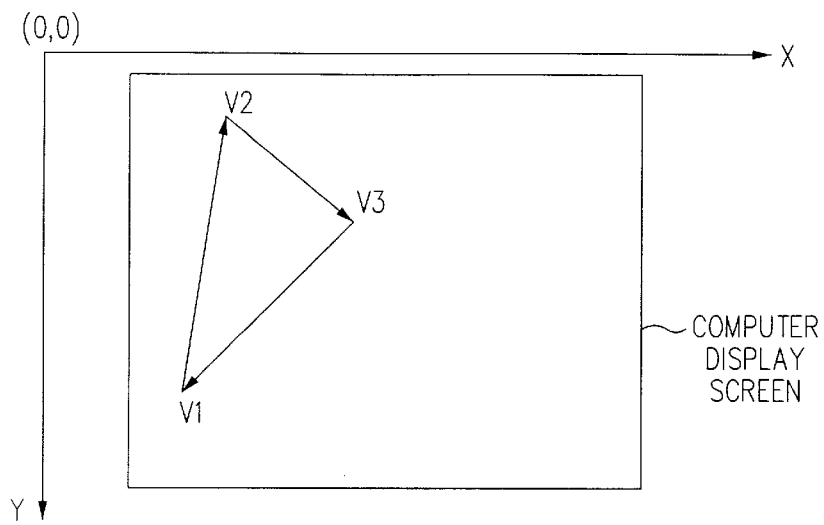
FIG. 4A illustrates an image in a right handed coordinate system on a computer display.
Figure 4B:
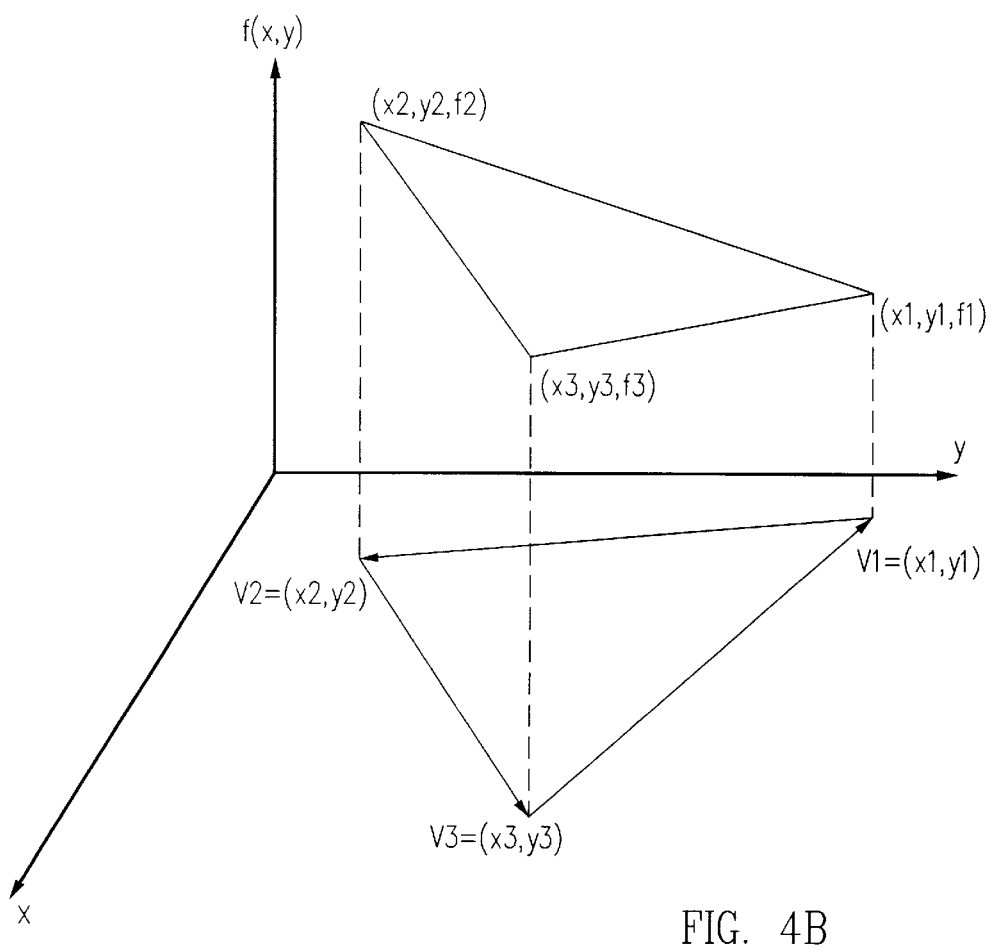
FIG. 4B illustrates a function defined by three points.

As shown in FIG. 4B, a triangular polygon on the image plane is defined by three vertices:

$$V1=(x1, y1), V2=(x2, y2), V3=(x3, y3)$$

A linear function f(x,y) can be defined for every point (x,y) on the image plane by defining a reference value, f(0,0), and two gradients, dfx and dfy.

$$f(x,y)=f(0,0)+dfx*x+dfy*y \qquad (1)$$

where $$dfx = \frac{\partial f}{\partial x}, \text{ and } dfy = \frac{\partial f}{\partial y}$$

In an exemplary embodiment, the function values are computed at the three vertices of the triangle. The function values at other points are then determined based on the values at the three vertices. The gradient computations may require the triangulation of polygon faces that have more than three vertices. In the function illustrated in FIG. 4B, the value of the function is known at the three vertices: V1, V2, and V3. The value of the function at these three vertices is f1, f2 and f3 where:

$$f1=f(x1, y1), f2=f(x2, y2), f3=f(x3, y3)$$

The two function gradients, dfx and dfy, for a triangular polygon are computed from the function values at the three vertices that define the triangle, where:

$$dfx = \frac{\partial f}{\partial x}, \quad x \text{ derivative of } f \text{ for } y = \text{constant}$$

$$dfy = \frac{\partial f}{\partial y}, \quad y \text{ derivative of } f \text{ for } x = \text{constant}$$

The two image coordinates (x,y) and the function f(x,y) can be interpreted as a three-dimensional coordinate system (x,y,f).

In FIG. 4A the image plane xy coordinate system is a right handed coordinate system. This means that the f(x,y) coordinate axis of FIG. 4B points away from the image observer. In this figure it is assumed that the triangle on a screen is viewed from the negative side of f(x,y). In a right handed coordinate system the triangle V1 V2 V3 is described in a counter-clockwise direction. It appears as clockwise when viewed from he negative side of f(x,y). For triangles that are visible from one side only, the sign of the area is used to determine whether the triangle is visible. Depending on the visibility criteria, triangles with positive area are visible, or triangles with negative area are visible.

The following describes two methods of computing the dfx and dy gradients. The following definitions are used in the derivation of equations for dfx and dfy:

$$dx12=x2-x1, dx23=x3-x2\ dx31=x1-x3$$

$$dy12=y2-y1, dy23=y3-y2\ dy31=y1-y3$$

$$df12=f2-f1, df23=f3-f2$$

Equations for the dfx and day gradients are derived as follows:

$$f2=f1+dfx*dx12+dfy*dy12 \qquad (2)$$

$$f3=f2+dfx*dx23+dfy*dy23 \tag{3}$$

Equations (2) and (3) are based on the definition of linear equations.

$$df12=f2-f1=dfx*dx12+dfy*dy12 \tag{4}$$

$$df23=f3-f2=dfx*dx23+dfy*dy23 \tag{5}$$

Dividing equation (4) by dy12 and dividing equation (5) by dy23 yields:

$$df12/dy12=dfx*dx12/dy12+dfy \tag{6}$$

$$df23/dy23=dfx*dx23/dy23+dfy \tag{7}$$

Subtracting equation (7) from equation (6) yields:

$$dfx=(df12/dy12-df13/dy23)/(dx12/dy12-dx23/dy23) \tag{8}$$

Solving equations (6) and (7) for dfy yields:

$$dfy=df12/dy12-dfx*(dx12/dy12) \tag{9}$$

$$dfy=df3/dy23-dfx*(dx23/dy23) \tag{10}$$

Since equations (4) and (5) are symmetrical in x and y, the complementary equations to (8), (9) and (10) can be obtained as follows. Exchanging x and y in equations (8)–(10) provides the following alternative equations for dfx and dfy:

$$dfy=(df12/dx12-df23/dx23)/(dy12/dx12-dy23/dx23) \tag{11}$$

$$dfx=df12/dx12-dfy*(dy12/dx12) \tag{12}$$

$$dfx=df23/dx23-dfy*(dy23/dx23) \tag{13}$$

Equations (10) and (13) are equivalent. They use the slopes df/dx, df/dy, dx/dy and dy/dx along the triangle edges to compute the gradients dfx and dfy. According to these equations, the horizontal gradient dfx and the vertical gradient dfy are not directly proportional. They are proportional with an offset. As a result, in the event of a gradient value overflow, one of the gradients cannot be limited without affecting the other.

The above expressions for the dfx and dfy gradients provide one method of computing the slope of a function. In this method, equations (8) and (10) are the preferred equations for computing the slope when the values of dy are greater than the values of dc, that is when the polygon has a vertical orientation. Whereas for computing the slope when the values of dx are greater than the values of dy, that is when the polygon has a horizontal orientation, equations (11) and (13) are the preferred equations for this method.

A more efficient approach to computing the slope of a function uses modified versions of equations (8) and (11). Equations (8) and (11) are modified so that they have a common divisor, (dx12*dy23–dx23*dy12), and so that there are no fractions in the numerators and denominators.

Multiplying equation (8) by (dy12*dy23)/(dy12*dy23) yields $$dfx=(df12*dy23-df13*dy12)/(dx12*dy23-dx23*dy12) \tag{14}$$

Similarly, multiplying equation (11) by (dx12*dx23)/(dx12*dx23) yields $$dfy=(df12*dx23-df23*dx12)/(dy12*dx23-dy23*dx12) \tag{15}$$

$$dfy=(dx12*df23-dx23*df12)/(dx12*dy23-dx23*dy12) \tag{16}$$

Figure 5:
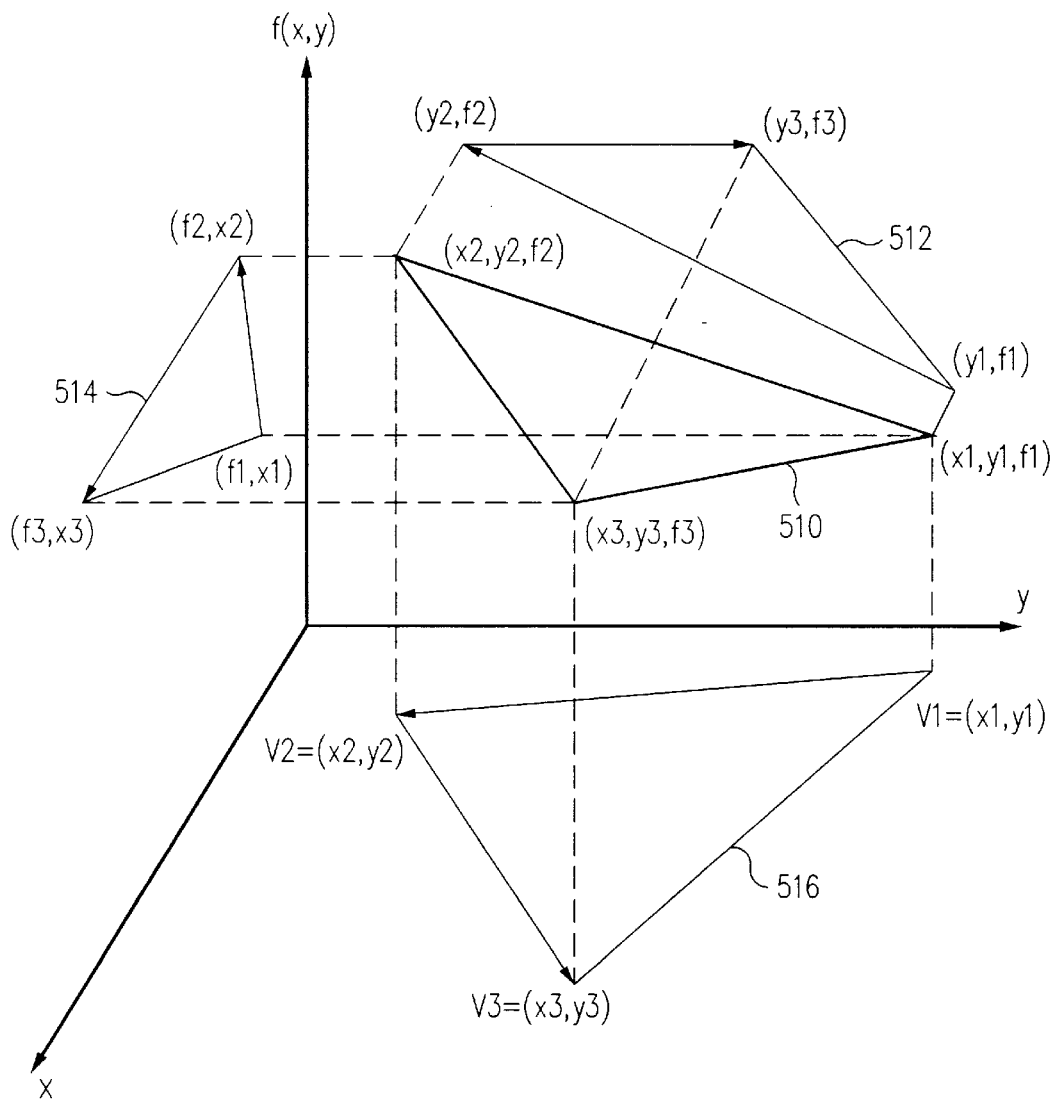
FIG. 5 illustrates the function f(x,y) of image triangle V1 V2 V3 as a triangle in a three-dimensional coordinate system.

The common denominator (divisor) represents twice the area of displayed triangle 516 defined by V1, V2 and V3 in FIG. 5. Triangle 516 is also the projection of triangle 510 onto the f=0 plane. This is the cross product of:

$$(V2-V1) \times (V3-V2)=(dx12,dy12) \times (dx23,dy23) \tag{17a}$$

$$=dx12*dy23-dx23*dy12 \tag{17b}$$

$$=2*(\text{area of triangle } V1\ V2\ V3) \tag{17c}$$

The function f(x,y) can be represented as a triangle in a three-dimensional coordinate system (x,y,f) and its projections are illustrated in FIG. 5. The numerator of equation (14) is equal to twice the area of triangle 512 with sign inverted, illustrated in FIG. 5. Triangle 512 is the projection of triangle 510 onto the x=0 plane:

$$((y2, f1)-(y1, f1)) \times ((y3, f3)-(y2, f1))=(dy12, df12) \times (dy23, df23) \tag{18a}$$

$$=dy12*df73-dy23*df12 \tag{18b}$$

$$=2*(\text{area of triangle } (y1, f_1)(y2, f2)(y3, f3)) \tag{18c}$$

Thus using the triangle projected onto the x=0 plane, the gradient dfx can be expressed as the ratio of two areas:

$$dfx=-(\text{area of projected triangle onto } x\text{=0 plane})/(\text{area of projected triangle onto } f\text{=0 plane}) \tag{19}$$

Also, the numerator of equation (16) is equal to twice the area of triangle 516 with sign inverted, which is the projection of triangle 510 onto the y=0 plane:

$$((f2, x2)-(f1, x1)) \times ((f3, x3)-(f2, x2))=(df12, dx12) \times (df23, dx23) \tag{20a}$$

$$=df12*dx23-df23*dx12 \tag{20b}$$

$$=2*(\text{area of triangle } (f1, x1)(f2, x2)\ (f3, x3)) \tag{20c}$$

Thus using the triangle projected on the y=0 plane, the gradient dy can be expressed as the ratio of two areas:

$$dfy=-(\text{area of projected triangle onto } y\text{=0 plane})/(\text{area of projected triangle onto } f\text{=0 plane}) \tag{23}$$

Thus two methods of computing the gradients have been described. The first method uses equations (8), (10), (11) and (13). The second method uses equations (14) and (16). An advantage of the second method is that it uses a common denominator for both gradients.

Slope Size Limitation

The magnitude of slopes should be contained within a certain range to prevent computation errors when the function values are computed for each pixel of the image. As described above, gradient values depend on the ratio of two projected areas from the three-dimensional triangle. The common divisor that is used for the gradient computations represents twice the area of the projected triangle defined by V1, V2 and V3 in the image plane. The gradients or slopes can overflow when this area approaches zero.

The following area should be controlled to avoid overflows:

$$(V2-V1) \times (V3-V2)=dx12*dy23-dx23*dy12=2*(\text{area of triangle } V1\ V2\ V3) \tag{24}$$

As was shown in the previous section, the two gradients dfx and dfy are proportional, but with an offset. In the event of a slope value overflow, one of the slopes cannot be limited without affecting the other slope.

The following area relationships are used to implement an efficient method of limiting gradients. The area of a triangle and its largest dimension are used to determine whether the width of that triangle should be increased so that the gradients do not exceed the system's dynamic range. To simplify the derivation of the relationships the area of the parallelogram corresponding to a given triangle is used. This is based on the fact that the area of a parallelogram is equal to the area of the cross product of the two vectors that define the parallelogram. This area is two times the area of the triangle defined by the two vectors.

Figure 6A:
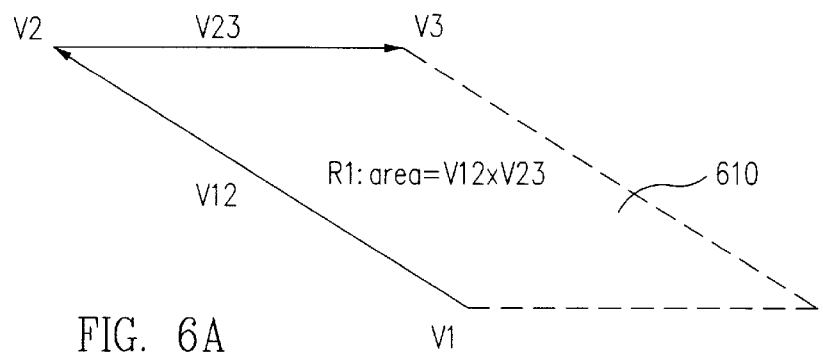
FIG. 6A illustrates a parallelogram defined by two vectors V12 and V23.

The area of parallelogram 610 illustrated in FIG. 6A is given by the equation $$\text{area} = (V2-V1) \times (V3-V2) = dx12 * dy23 - dx23 * dy12 \quad (25)$$

This area is also equal to two times the area of triangle V1 V2 V3.

Figure 6B:
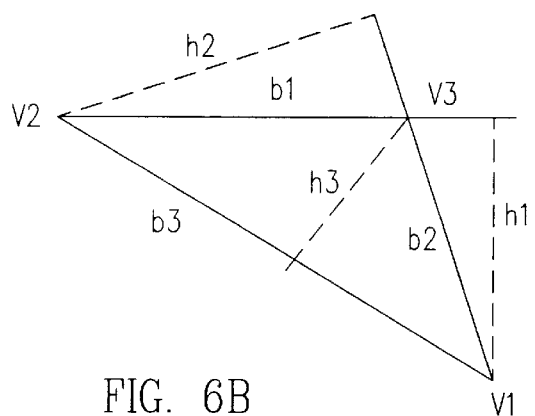
FIG. 6B illustrates three ways to represent a triangle.

As illustrated in FIG. 6B, the area of a triangle with base b and height h is given by the equation $$\text{area} = b1*h1 = b2*h2 = b3*h3 \quad (26)$$

This area is equal to two times the area of triangle V1 V2 V3.

Figure 6C:
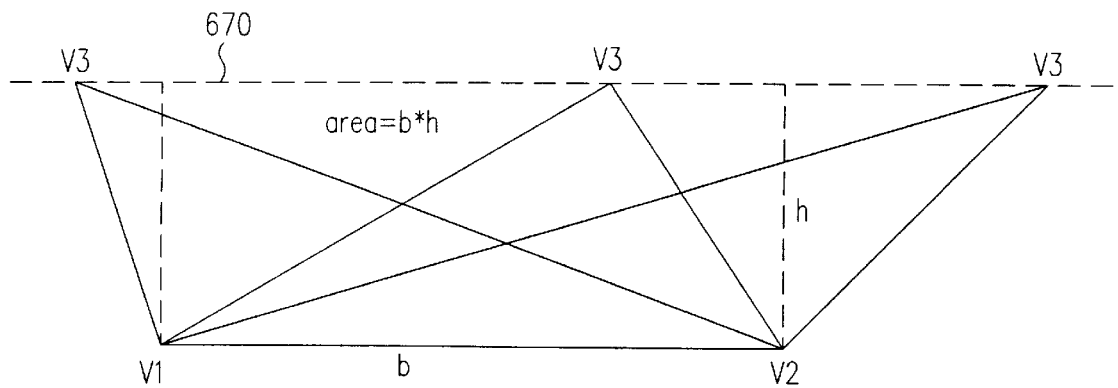
FIG. 6C illustrates several triangles having the same area, and each having a common base and a vertex on a line parallel to the base.

As illustrated in FIG. 6C, the area of a rectangle defined with base b and height h is equal to two times the area of a triangle defined with the same base b and height h $$\text{area} = b*h = 2*(\text{area of triangle } V1\ V2\ V3) \quad (27)$$

There are an infinite number of triangles that can be formed with a base V1 V2 and a vertex V3 defined by any point on line 670. FIG. 6C illustrates three triangles with three different V3 points. All of the triangles with base V1 V2 and a vertex V3 on line 670 have the same area.

Figure 6D:
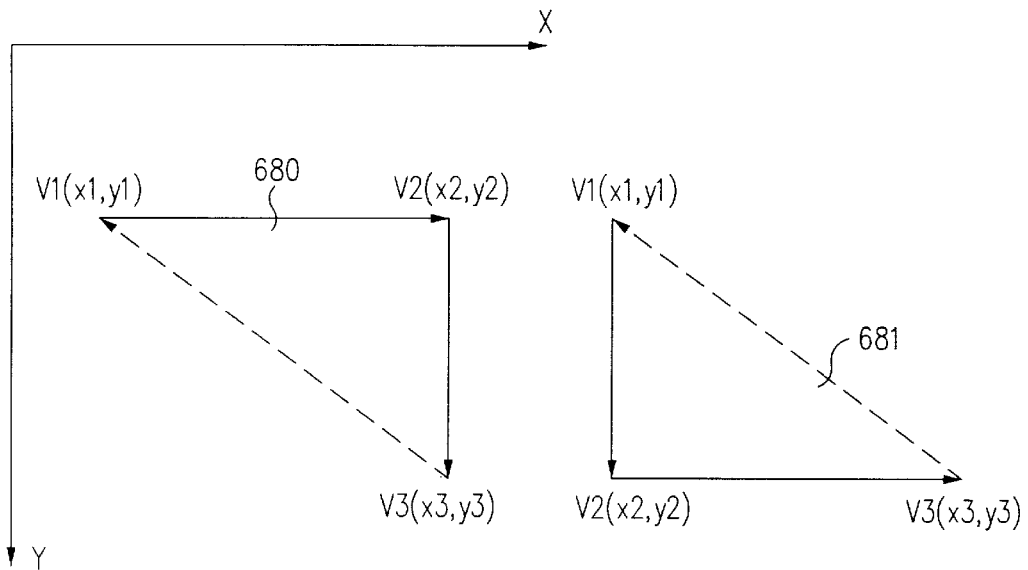
FIG. 6D illustrates area computations for clockwise and counter-clockwise triangles.

FIG. 6D illustrates area computations for clockwise and counter-clockwise triangles. The XY coordinate axis in FIG. 6D is a right handed coordinate system. This means that the f(x,y) coordinate axis points away from the image. The area computation requires a two dimensional vector cross product. Given a triangle V1 V2 V3, where V1=(x1, y1), V2=(x2, y2) and V3=(x3, y3), the cross product of the first two edges is:

$$(V2-V1) \times (V3-V2) = (x2-x1)*(y3-y2) - (x3-x2)*(y2-y1) \quad (28)$$

The value of this cross product is equal to the area of the parallelogram defined by the two vectors (V2−V1) and (V3−V2). This area is equal to twice the area of the triangle V1 V2 V3. In the computations, the value of the cross product is referred to as the triangle area (i.e. proportional to the triangle area). Referring to FIG. 6D, the edges of triangles 680 and 681 line up with the X and Y axis. For the first edge of triangle 680, the value x2−x1 is positive and the value y2−y1 is zero. For the second edge of triangle 680, the value x3−x2 is zero and the value y3−y2 is positive. For clockwise triangles (triangle 680) the area is positive. For the first edge of triangle 681, the value of x2−x1 is zero and the value of y2−y1 is positive. For the second edge of triangle 681, the value of x3−x2 is positive, and the value of y3−y2 is zero. For counter-clockwise triangles (triangle 681) the area is negative.

Figure 7:
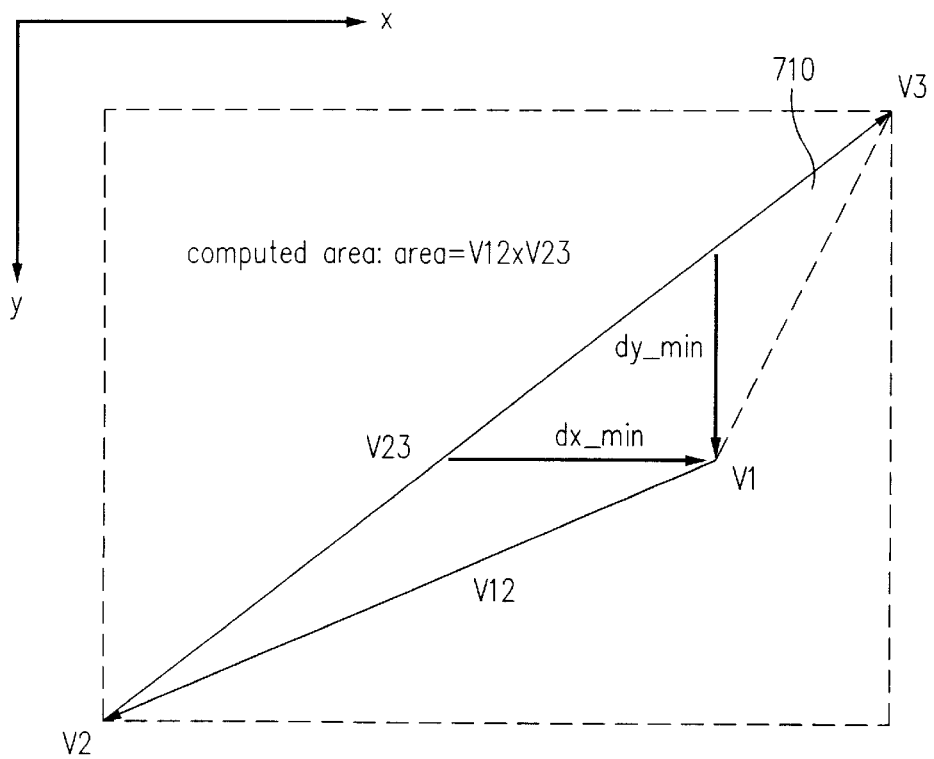
FIG. 7 illustrates how the width of a triangle, dx_min, and the height of a triangle, Gamin, are defined.

The polygon area is used to determine the width of the polygon. This width is then compared with a threshold and corrected if the width is less than the threshold. An example of a triangular polygon 710 for which gradients have to be computed is illustrated in FIG. 7. The maximum gradient values are determined by the value of the largest delta x (dx_min) and the largest delta y (dy_min) that can be measured inside of the triangle defined by V1 V2 V3. The smaller the value of these deltas, the larger the gradient in the direction of the deltas. The gradients can be controlled by preventing the size of dx_min and _min from being smaller than a predetermined number of pixels, n. For example in an exemplary embodiment, the gradient of the RGB color components are limited to a change of 128 per pixel. The maximum displayable range of the RGB components is 256. The gradients can be controlled by making sure that the size of dx_min and dy_min never become smaller than two pixels (n=2). That means that if the size of dx_min and dy_min is at least two pixels, then the color component gradients will not be larger than a change of 128 per pixel.

Figure 8:
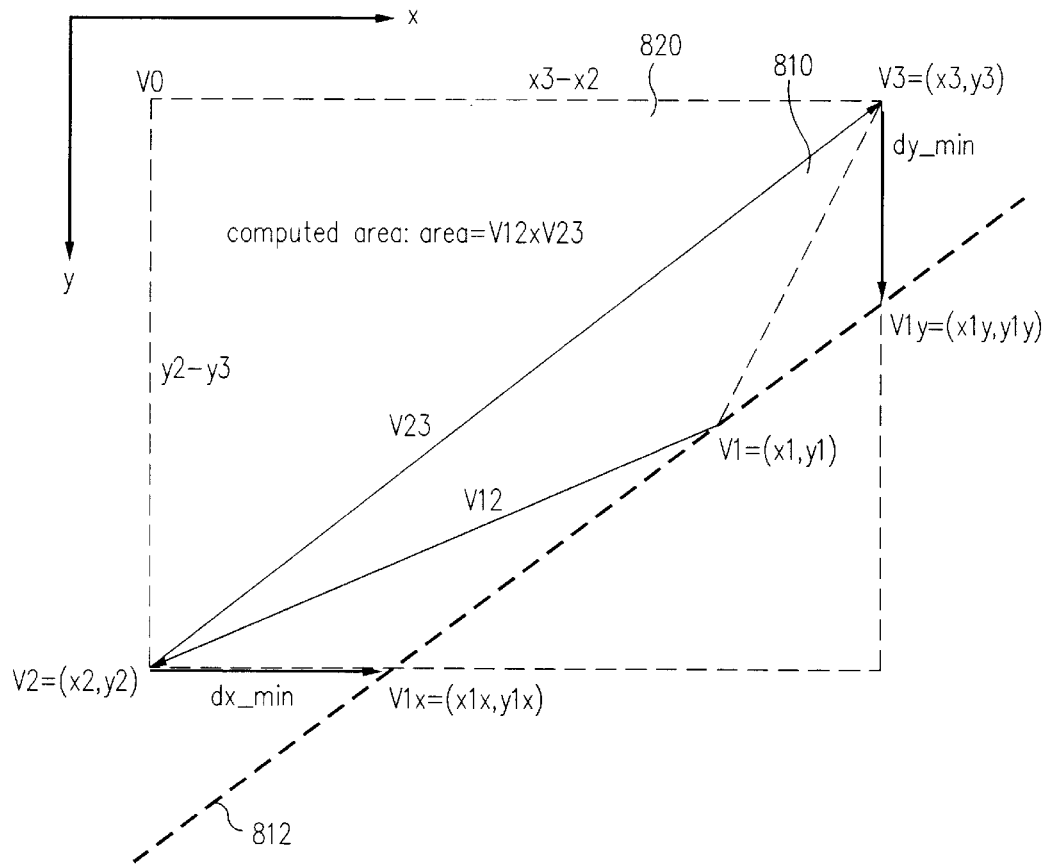
FIG. 8 illustrates a method of computing dy_min and dx_min for a triangle according to one embodiment of the present invention.

FIG. 8 illustrates one method of computing dy_min and dx_min values for a triangle. To derive equations to compute the maximum delta values, first a line is drawn parallel to the longest vector in the triangle. For triangle 810 the longest vector is V23, and line 812 is drawn parallel to V23. The intersection points V1x and V1y of line 812 with rectangle 820 defined by diagonal vector V23 define two segments:

(1) segment $V2\ V1x$ of length $dx\_min$: $dx\_min = x1x - x2$ \quad (29)

(2) segment $V3\ V1y$ of length $dy\_min$: $dy\_min = y1y - y3$ \quad (30)

The value of these maximum deltas is computed from the area of the triangle V1 V2 V3 where $$\text{area} = V2 \times V23 \quad (31)$$

According to the area relationship of equation (27), the areas of the three triangles, in FIG. 8, defined by the vertices V1 V2 V3, V1x V2 V3 and V1y V2 V3 are equal. The triangle base used to compute the area which is common to each of the three triangles is V23.

According to area equation (26), another base can be used to compute the same area. For the following relationship the new triangle base is dx_min. Area equation (27) can be applied again with the base defined as dx_min, and the height as y2−y3 which yields $$dx\_min*(y2-y3) = \text{area} \quad (32)$$

$$dx\_min = \text{area}/(y2-y3) \quad (33)$$

The area of triangle V1x V2 V3 is equal to the area of triangle V1x V2 V0 because the two triangles have the same base V1x V2 and the vertices of both triangles, V3 and V0, are on the same line parallel to that base. In one exemplary embodiment, if the size of dx_min is smaller than two pixels, then the vertex V1 is moved in the x-direction until dx_min is greater than or equal to two pixels.

Defining a triangle base as dy_min, and the height as x3−x2, and applying area equation (27) yields $$dy\_min*(x3-x2) = \text{area} \quad (34)$$

$$dy\_min = \text{area}/(x3-x2) \quad (35)$$

Based on equation (27) the area of triangle V1y V0 V3 is equal to the area of triangle V1y V2 V3, in FIG. 8. In one embodiment, if the size of dy_min is smaller than two pixels, then the vertex V1 is moved in the y-direction until dy_min is greater than or equal to two pixels.

Minimum Width Correction

Figure 9:
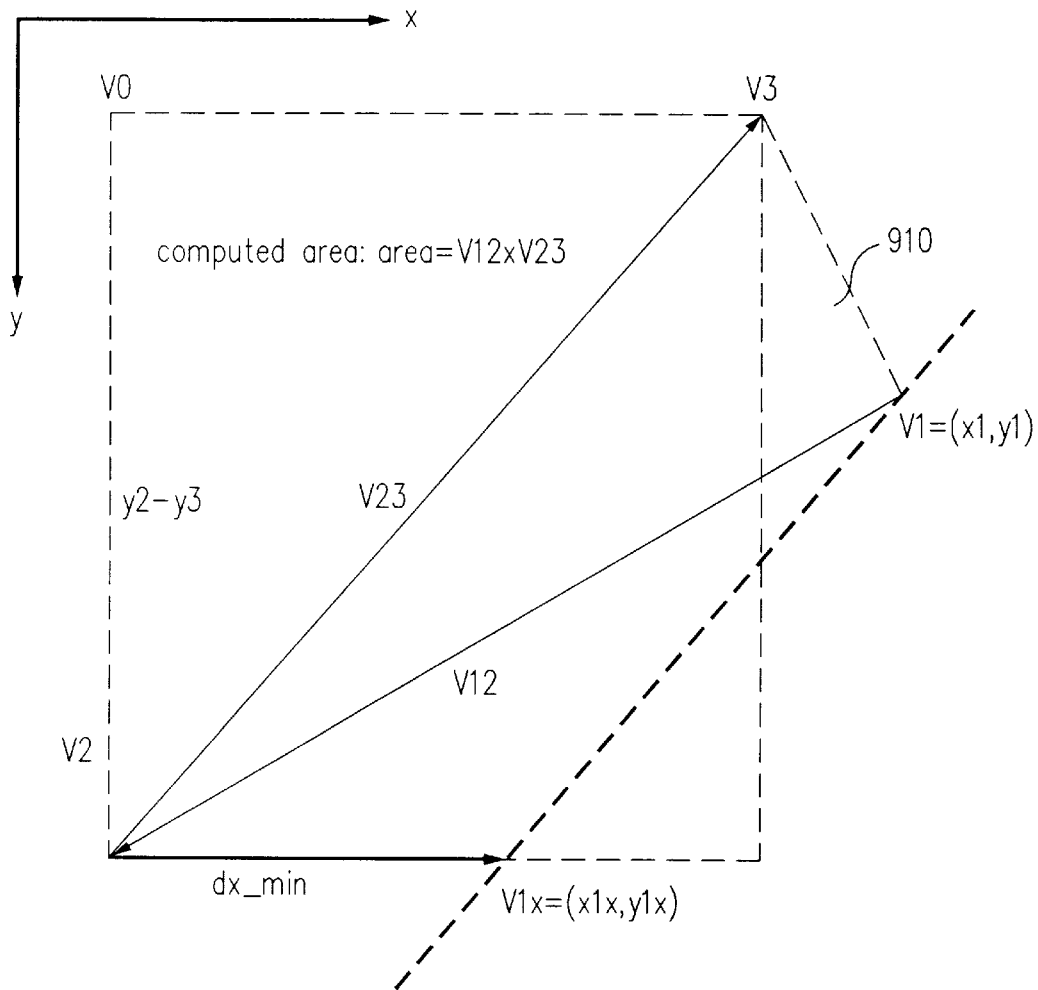
FIG. 9 illustrates a triangle for which dx_min is computed.

FIGS. 3A and 3B illustrate a flow chart of a method of correcting triangular polygons with sub-threshold dx_min or dy_min values according to one embodiment of the present invention. The method of FIG. 3A uses the area and dx_min computation methods described above. The first step in the method, step 312, is to compute the delta y values. The area of the parallelogram defined by triangle V1 V2 V3 910, illustrated in FIG. 9, is $$area = V12 \times V23 = dx12 * dy23 - dx23 * dy12 \qquad (36)$$

This area is positive for clockwise triangles and negative for counter-clockwise triangles. After computing the dx12, dy23, dx23 and dy12 values, the area of the parallelogram is computed in step 314. In step 316, the area of the triangle is tested.

For example, assuming a cull counter-clockwise mode where only the clockwise triangles are kept, if the area is positive then the triangle is visible and the method proceeds to step 324. Otherwise, at step 318 the procedure ends, because if the area of the triangle is zero or negative then the triangle is not visible, and there is no need to check for gradient overflows. At step 324 the vector with the largest delta y is selected. The sign of the largest delta y indicates if the correction vertex is on the right side which corresponds to the area of triangle 910, illustrated in FIG. 9, divided by delta y being greater than zero, or is on the left side which corresponds to the area of triangle 910 divided by delta y being less than zero. In the FIG. 9 example, vector V23 has the largest delta y. The V23 delta y is equal to y3−y2 and is less than zero. If the triangle area is positive, the correction vertex V1 is on the right side of the triangle. The computed horizontal width is dx_min. If dx_min is less than two pixels then the triangle area needs to be corrected.

One method of determining the largest delta y of a triangle is to compare the sign of the delta y of the three edges of the triangle. The delta y with a different sign from the other two is the largest delta y. This method can be implemented in a look-up table:

TABLE 1

| delta y Code | Sign (dy12, dy23, dy31) | Selected Edge | Largest delta y |
|---|---|---|---|
| 0 | +++ | E1* | dy12 |
| 1 | ++− | E3 | dy31 |
| 2 | +−+ | E2 | dy23 |
| 3 | +−− | E1 | dy12 |
| 4 | −++ | E1 | dy12 |
| 5 | −+− | E2 | dy23 |
| 6 | −−+ | E3 | dy31 |
| 7 | −−− | E1* | dy12 |

*Note that code values of zero or seven should not occur, because the triangles are closed and there should be negative values to compensate for the positive values of the deltas. Code 0 could occur if all three vertices have the same y value. In one embodiment edge E1 is selected by default.

At step 326, the triangle area computed in step 314 using absolute values and the largest delta y vector selected in step 324 are used to compute dx_min where $$dx\_min = \frac{|area|}{|largest\ delta\ y|} \qquad (37)$$

In one embodiment, a quick division method is used to increase computational efficiency. In this embodiment division is replaced by subtraction of logarithmic values. The IEEE floating point implementation is a close approximation to logarithmic form. Thus by using a union of several equivalent variables (integer, floating point, bit fields, etc.), the division can be performed as a subtraction of two integers that contain the bit fields of the floating point variables. The subtraction result is then converted to a floating point number by adding the exponent offset to the integer.

After computing dx_min, at step 328 the value of dx_min is compared with the minimum triangle width threshold value. This test uses intermediate values of the gradient computations and thereby minimizes the extra time that the gradient clamping test requires. If dx_min is greater than the threshold value then the triangle width does not require correction. If dx_min is less than the minimum threshold width allowed for gradient computations, then the magnitude of the required correction is computed at step 329.

In one embodiment, the threshold value, n, is set equal to two, and the correction is $$corr\_dx = 2 - |dx\_min| \qquad (38)$$

A further improvement to the method multiplies the correction with a constant, K, so that the narrower the triangle, the larger the correction.

$$corr\_dx = K(2 - |dx\_min|) \qquad (38.1)$$

For example, one embodiment uses K=2.

Step 330 determines if the triangle area is negative. If so, step 332 inverts the sign of corr_dx, so corr_dx is less than zero. At step 333 the correction vertex position is modified. If dx_min is greater than zero, then the correction value is added to the third vertex x coordinate value. The third vertex is the vertex that is not part of the largest delta y vector. Performing the correction in this manner ensures that the original triangle is inside of the modified triangle. If dx_min is negative then the correction value is subtracted from the third vertex x coordinate value. In the FIG. 9 example, the x1 component of vertex V1 is corrected by adding the value of the correction to x1.

The vertex is moved by modifying the delta x of the two adjacent edges. The vertex on the image is not moved. The correction operation for dx_min can be performed by using the signs of the three delta y values of the triangle, the Sign (dy12, dy23, dy31) column in Table 2, to detect which vertex has to be moved. The correction to the delta x values dx12 and dx23 is shown in Table 2 for a clockwise triangle (positive area). The value of corr_dx is positive for clockwise triangles. For counter-clockwise triangles (negative area), the sign of the corr_dx has to be inverted, so that corr_dx is less than zero (step 332).

TABLE 2

| delta y Code | Sign (dy12, dy23, dy31) | Selected Vertex | Corrected delta x (dx12 and dx23) |
|---|---|---|---|
| 0 | +++ | * | dx12c = dx12<br>dx23c = dx23 |
| 1 | +V2+− | V2 | dx12c = dx12 + corr_dx<br>dx23c = dx23 − corr_dx |
| 2 | V1+−+ | V1 | dx12c = dx12 − corr_dx<br>dx23c = dx23 |
| 3 | +−V3− | V3 | dx12c = dx12<br>dx23c = dx23 − corr_dx |
| 4 | −+V3+ | V3 | dx12c = dx12<br>dx23c = dx23 + corr_dx |
| 5 | V1−+− | V1 | dx12c = dx12 + corr_dx<br>dx23c = dx23 |
| 6 | −V2−+ | V2 | dx12c = dx12 − corr_dx<br>dx23c = dx23 + corr_dx |
| 7 | −−− | * | dx12c = dx12<br>dx23c = dx23 |

*Note that, as described above, code values of zero or seven should not occur, and therefore no vertex is indicated for these cases.

After the vertex is moved, a recompute flag is set at step 334. Next the moved vertex is marked at step 335, and the dy_min test is performed as described in the FIG. 3B flow chart.

Figure 10:
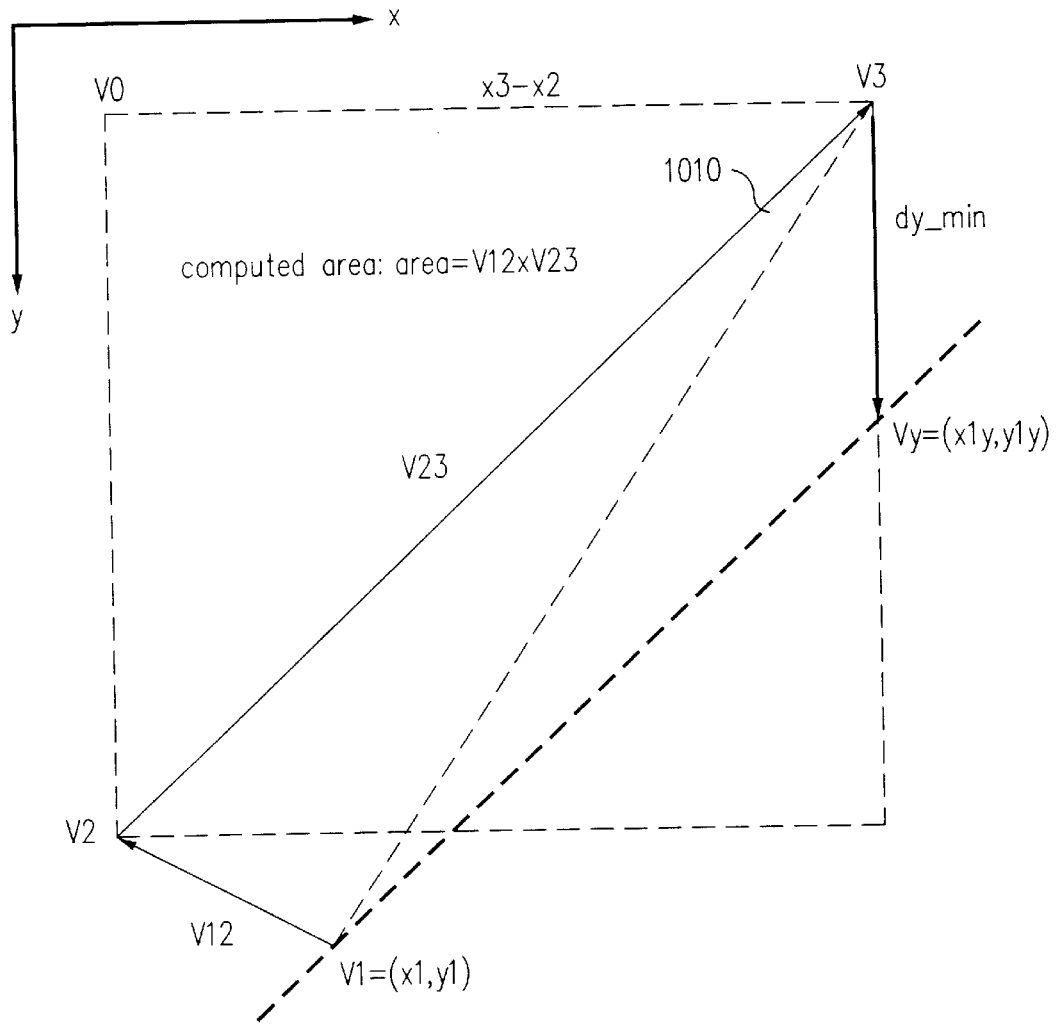
FIG. 10 illustrates a triangle for which dy_min is computed.
Figure 11:
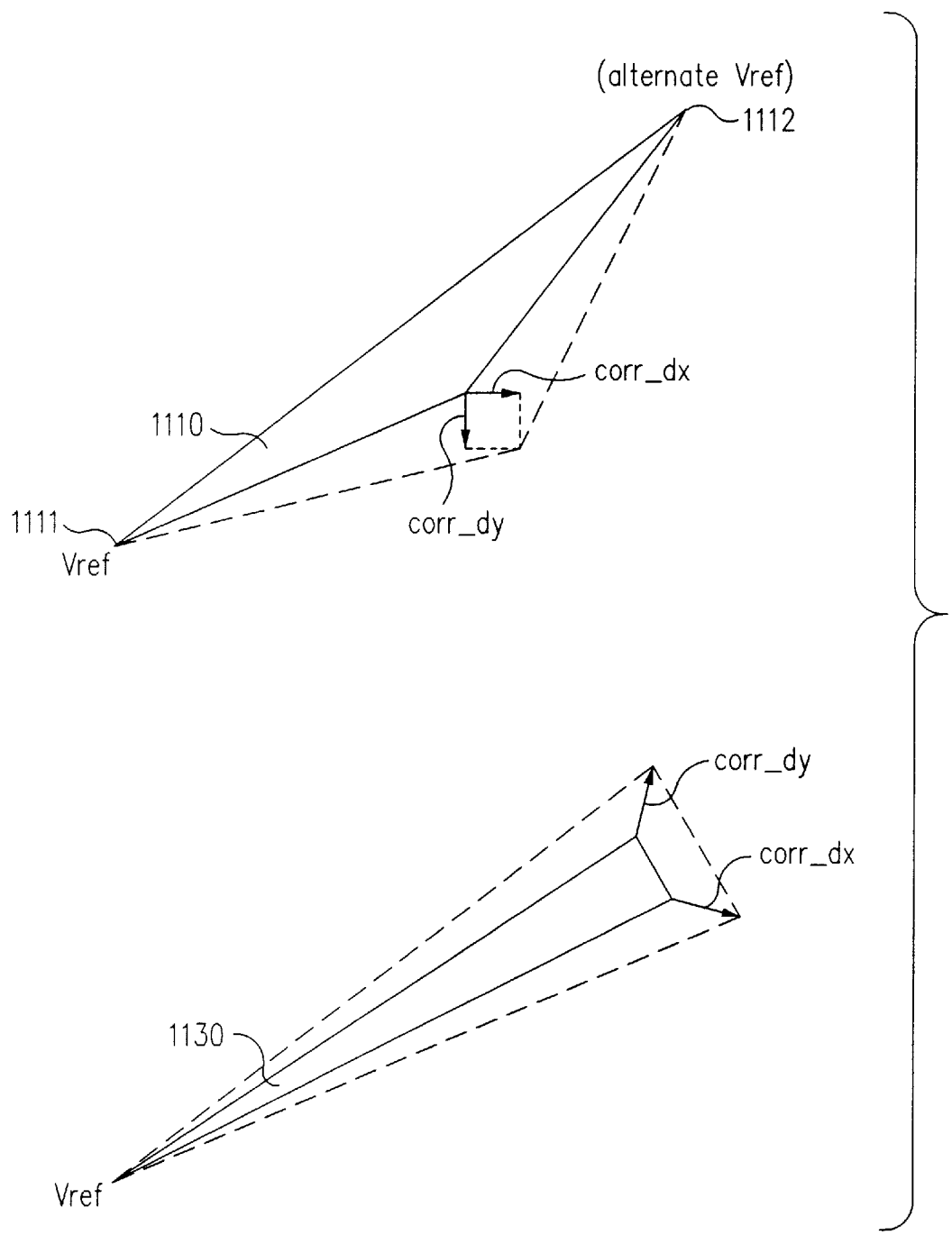
FIG. 11 illustrates triangles that include modifications to correct sub-threshold minimum dimensions.

The area of the parallelogram defined by triangle V1 V2 V3 1010, illustrated in FIG. 10, is $$area=V12 \times V23=dx12*dy23-dx23*dy12 \quad (39)$$

This area is positive for clockwise triangles and negative for counter-clockwise triangles. One method of determining the largest delta x is to compare the sign of the delta x of the three edges of the triangle. The delta x with a different sign from the other two is the largest delta x. This method can be implemented in a look-up table as follows:

TABLE 3

| delta x Code | Sign (dx12, dx23, dx31) | Selected Edge | Largest delta x |
|---|---|---|---|
| 0 | +++ | E1* | dx12 |
| 1 | ++− | E3 | dx31 |
| 2 | +−+ | E2 | dx23 |
| 3 | +−− | E1 | dx12 |
| 4 | −++ | E1 | dx12 |
| 5 | −+− | E2 | dx23 |
| 6 | −−+ | E3 | dx31 |
| 7 | −−− | E1* | dx12 |

*Note that code values of zero or seven should not occur, because the triangles are closed and there should be negative values to compensate for the positive values of the deltas. In one embodiment edge E1 is selected by default.

Referring to FIGS. 3A and 3B, at step 366, the triangle area computed in step 314 and the largest delta x vector selected in step 364 are used to compute the triangle height dy_min using absolute values where $$dy\_min = \frac{|area|}{|largest\ delta\ x|} \quad (40)$$

In a quick division embodiment, dy_min is computed by subtracting two integers that contain the bit fields of "area" and "largest delta x." The sign of the floating point number is saved to determine how to apply the correction. At step 368 the value of dy_min is compared with a threshold value. If dy_min is greater than the threshold, there is no dy_min correction and the method jumps to step 376. If dy_min is less than the threshold then the dy_min correction is computed at step 369.

In one embodiment the threshold value, n, is set equal to two and the correction is $$corr\_dy=2-|dy\_min| \quad (41)$$

Similar to equation (38.1), a further improvement to the method multiplies the correction with a constant, K, so that the narrower the triangle the larger the correction $$corr\_dy=K(2-|dy\_min|) \quad (41.1)$$

Step 370 determines if the triangle area is negative. If so, step 372 inverts the sign of corr_dy, so corr_dy is less than zero. At step 373 the correction vertex position is modified. If dy_min is greater than zero, then the correction value is added to the third vertex y coordinate value, where the third vertex is the vertex that is not part of the largest delta x vector. If dy_min is negative then the correction value is subtracted from the third vertex y coordinate value. In the FIG. 10 example, the y1 component of vertex V1 is corrected by adding the value of the correction to y1.

The value of the corrected delta y after the vertex is moved is given by Table 4 for clockwise triangles (positive area). The value of corr_dy is positive for clockwise triangles. For counter-clockwise triangles (negative area) the sign of the correction corr_dy is inverted, so that corr_dy is less than zero (step 372).

TABLE 4

| delta x Code | Sign (dx12, dx23, dx31) | Selected Vertex | Corrected delta y (dy12 and dy23) |
|---|---|---|---|
| 0 | +++ | * | dy12c = dy12<br>dy23c = dy23 |
| 1 | +V2+− | V2 | dy12c = dy12 − corr_dy<br>dy23c = dy23 + corr_dy |
| 2 | V1+−+ | V1 | dy12c = dy12 + corr_dy<br>dy23c = dy23 |
| 3 | +−V3− | V3 | dy12c = dy12<br>dy23c = dy23 + corr_dy |
| 4 | −+V3+ | V3 | dy12c = dy12<br>dy23c = dy23 − corr_dy |
| 5 | V1−+− | V1 | dy12c = dy12 − corr_dy<br>dy23c = dy23 |
| 6 | −V2−+ | V2 | dy12c = dy12 + corr_dy<br>dy23c = dy23 − corr_dy |
| 7 | −−− | * | dy12c = dy12<br>dy23c = dy23 |

*Note that, as described above, code values of zero or seven should not occur, and therefore no vertex is indicated for these cases.

After the vertex is moved, a recompute flag is set at step 374. The moved vertex is then marked (step 375). The recompute flag is then checked to determine whether a vertex has been moved due to either dx_min or dy_min being less than the threshold (step 376). If the recompute flag is set then a new triangle area is computed at step 377. Otherwise, the method ends at step 378.

The correction of dx_min and dy_min can affect one or two vertices of the polygon, but only one x and only one y value needs to be corrected. After correcting the delta x and delta y values, a new area is computed for the denominator used in slope computations. The new delta x and delta y values have to be used for the numerator of the dfx and dfy equations. The modified triangle can be used for all the slope calculations. The modified triangle is used for all the gradient computations but is not displayed on the screen. The original triangle is displayed using the function values of the modified triangle.

After completing the methods of FIG. 3A and FIG. 3B, for visible triangles the next step is to compute the inverse of the triangle area in step 380 of FIG. 3C, where $$InvArea=1/TriArea \quad (42)$$

Next at step 282 the four scaled deltas are obtained by multiplying the corresponding delta with InvArea. If vertices have been moved then dx12c, dx23c, dy12c, and dy23c are used.

$$scaled\_dx12=dx12c/TriArea=dx12c*InvArea \quad (43)$$

$$scaled\_dx23=dx23c/TriArea=dx23c*InvArea \quad (44)$$

$$scaled\_dy12=dy12c/TriArea=dy12c*InvArea \quad (45)$$

$$scaled\_dy23=dy23c/TriArea=dy23c*InvArea \quad (46)$$

To further optimize efficiency the inverse area can be computed in parallel with the performance of the minimum triangle width test. For any triangles whose width is corrected to meet the minimum width, the triangle area may have to be recomputed along with the inverse area and scaled delta values.

At step 383 a reference vertex is selected. The reference vertex should be a vertex that has not been moved. In one embodiment, first vertex one is checked to determine whether it has been moved, if not then it is used as the reference vertex. Otherwise vertex two is checked to determine whether it has been moved. If vertex two has not been moved then vertex two is used as a reference vertex, otherwise vertex three is used. At step 384 the function values at the three triangle vertices are obtained. At step 385 the function delta values are computed.

$$df12=f2-f1 \quad (47)$$

$$df23=f3-f2 \quad (48)$$

At step 386, the gradient in the x-direction is computed. The function can be expressed as $$f(x,y)=f(0,0)+dfx*x+dfy*y \quad (49)$$

where dfx is the gradient of the function f(x,y) in the x-direction, and is computed as $$dfx=(df12*dy23-df23*dy12)/(dx12*dy23-dx23*dy12) \quad (50)$$

At step 388, the gradient in the y-direction is computed. The gradient of the function f(x,y) in the y-direction is dfy, and is computed as $$dfy=(dx12*df3-dx23*df12)/(dx12*dy23-dx23*dy12) \quad (51)$$

The gradient equations can be simplified using the following relationships:

$$dx12*dy23-dx23*dy12=TriArea \quad (52)$$

$$1/(dx12*dy23-dx23*dy12)=1/TriArea=InvArea \quad (53)$$

$$scaled\_dx12=dx12*InvArea \quad (54)$$

$$scaled\_dx23=dx23*InvArea \quad (55)$$

$$scaled\_dy112=dy12*InvArea \quad (56)$$

$$scaled\_dy23=dy23*InvArea \quad (57)$$

Substituting equations (52)–(57) into equations (50) and (51) yields $$dfx=df12*scaled\ dy23-df23*scaled\_dy2 \quad (58)$$

$$dfy=scaled\_dx12*df23-scaled\_dx23*df12 \quad (59)$$

Using gradient equations (58) and (59), at step 390, the function value at a reference point, f(0,0), is computed using the value of the function at a reference vertex $V_{ref}$.

$$f(0,0)=f(x_{ref},y_{ref})-dfx*x_{ref}-dfy*y_{ref}=f(x_{ref},y_{ref})-(dfx*x_{ref}+dfy*y_{ref})$$

where $x_{ref}$, $y_{ref}$ are the coordinates of a reference vertex. In order for all the function values to remain within the boundary values of the original triangle, the original triangle should reside inside of the modified triangle, as illustrated by triangles 1110 and 1130 in FIG. 11. Therefore an unmodified vertex of the triangle, such as vertex 1111 or alternatively vertex 1112, should be selected as the reference vertex to compute the new reference value of the function. Any vertex that has been moved should not be used as a reference vertex.

The present invention checks the width and height of a triangle before computing a set of scaled dx and scaled dy values. Once the scaled values are obtained, they can be used to compute and limit the gradients of any function linear over the triangle (step 391). Step 392 ends the procedure if all of the functions have been computed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the present invention can be applied to polygons other than triangles.

What is claimed is:

1. In gradient computation hardware having a memory for storing a plurality of image variables, each image variable being assocaited with a predetermined number of bits capable of representing data within a dynamic range, a method of clamping, by the gradient computation hardware, gradients in a computer graphics image, the method comprising steps of:

computing, by the gradient computation hardware, the area of a polygon comprising a plurality of vectors, the polygon being associated with the computer graphics image;

selecting, by the gradient computation hardware, a vector of said plurality of vectors that has a largest first coordinate delta;

determining, by the gradient computation hardware, a maximum second coordinate delta using said polygon area and said largest first coordinate delta, wherin the second coordinate delta comprises a distance from a selected vertex of the polygon to an opposing side of the polygon along a line parallel to a coordinate axis;

comparing, by the gradient computation hardware, the second coordinate delta to a threshold number of pixels;

resolving, by the gradient computation hardware, a second coordinate delta correction value, when the second coordinate delta is less than the threshold; and, when the second coordinate delta is less than the threshold:

moving a vertex of the polygon, by the gradient computation hardware, so as to increase the second coordinate delta by the correction value to a corrected second coordinate delta value, wherein the corrected second coordinate delta value is at least equal to the threshold;

computing, by the gradient computation hardware, the area of a new polygon using the vertex, the new polygon being associated with vertex data;

storing, by the gradient computation hardware, the vertex data into at least a subset of the plurality of image variables, each vertex datum having a magnitude that is within the dynamic range of the at least a subset; and, outputting the vertex data to a display device.

2. The method of claim 1, wherein the step of determining further comprises a step of dividing the polygon area by the largest first coordinate delta to obtain a quotient which is equal to said second coordinate delta.

3. The method of claim 2, wherein said dividing step comprises subtracting a logarithmic representation of the largest first coordinate delta from a logarithmic representation of the second coordinate delta.

4. The method of claim 2, wherein said polygon comprises a triangle.

5. The method of claim 4, wherein the step of selecting further comprises a step of identifying a triangle edge by using a look-up table, the triangle edge corresponding to the first coordinate delta that is a different sign from the other two first coordinate deltas of the triangle, the triangle edge having the largest first coordinate delta.

6. The method of claim 4 further comprising steps of:
calculating gradients of the polygon; and
computing a function value at a reference point using the gradients.

7. The method of claim 6 wherein the step of calculating further comprises computing the gradients of the triangle as ratios of areas of two projections of the triangle.

8. An apparatus for clamping gradients in a computer graphics image comprising:
a computation unit;
a vertex buffer coupled to said computation unit, the vertex buffer for receiving vertex data associated with the computer graphics image;
a delta vertex buffer coupled to said computation unit, the delta vertex buffer for storing computed gradient values;
a code buffer coupled to said computation unit, for storing a look-up table;
wherein said computation unit computes the area of a triangle defined by a first, a second, and a third vector, the triangle being associated with the computer graphics image; selects the vector that has a largest first coordinate delta; computes a maximum second coordinate delta using said polygon area and said largest first coordinate delta, wherein the second coordinate delta comprises the distance from a selected vertex of the triangle to the opposing side of the triangle along a line parallel to a coordinate axis; compares the second coordinate delta to a threshold number of pixels; computes a second coordinate delta correction value, when the second coordinate delta is less than the threshold; moves a vertex, when the second coordinate delta is less than the threshold, so as to increase the second coordinate delta by the correction value to a corrected second coordinate delta value, wherein the corrected second coordinate delta value is at least equal to the threshold, computes the area of the new triangle, the new triangle being associated with vertex data defining one or more reference points, the vertex data being associated with a plurality of image variables having a dynamic range, the reference points having function gradients that are within the dynamic range of at least a subset of the image variables, and, outputting the vertex data to a display device.

9. The apparatus of claim 8, wherein said computation unit computes said maximum second coordinate delta by dividing the polygon area by the largest first coordinate delta to obtain a quotient which is equal to said second coordinate delta.

10. A computer program product for use in conjunction with a computer system, the computer program product comprising a computer readable storage medium and a computer program mechanism embedded therein, the computer program mechanism comprising:
a program module for clamping gradients in a computer graphics image to a dynamic range of a plurality of image variables, the program module including instructions for:
computing the area of a triangle defined by a first, a second, and a third vector;
selecting the vector that has a largest first coordinate delta;
calculating a maximum second coordinate delta using said polygon area and said largest first coordinate delta, wherein the second coordinate delta comprises the distance from a selected vertex of the triangle to the opposing side of the triangle along a line parallel to a coordinate axis;
comparing the second coordinate delta to a threshold number of pixels;
determining a second coordinate delta correction value, when the second coordinate delta is less than the threshold; and,
when the second coordinate delta is less than the threshold:
moving a vertex, so as to increase the second coordinate delta by the correction value to a corrected second coordinate delta value, such that the corrected second coordinate delta value is at least equal to the threshold;
resolving the area of a new triangle associated with the vertex the new triangle having a set of vertex data that have respective function gradients that are within the dynamic range of at least a subset of a plurality of image variables associated with the new triangle; and, outputting the vertex data to a display device.

11. The computer program product of claim 10, wherein said instructions for determining further comprise instructions for dividing the polygon area by the largest first coordinate delta to obtain a quotient which is equal to said second coordinate delta.

12. The method of claim 4, wherein said step of resolving further comprises resolving said second coordinate delta correction value by subtracting the second coordinate delta from the threshold and multiplying by a correction constant.

* * * * *